US007894391B2

(12) United States Patent
Kwon et al.

(10) Patent No.: US 7,894,391 B2
(45) Date of Patent: Feb. 22, 2011

(54) METHOD AND APPARATUS FOR TRANSMITTING/RECEIVING RESOURCE ALLOCATION INFORMATION THROUGH BITMAP IN A MOBILE COMMUNICATION SYSTEM USING SHARED CONTROL CHANNEL

(75) Inventors: Hwan-Joon Kwon, Hwanseong-si (KR); Dong-Hoo Kim, Yongin-si (KR); Jae-Chon Yu, Suwon-si (KR); Jin-Kyu Han, Seoul (KR); Jung-Soo Jung, Seongnam-si (KR); Yu-Chul Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 967 days.

(21) Appl. No.: 11/789,400

(22) Filed: Apr. 24, 2007

(65) Prior Publication Data

US 2008/0159211 A1 Jul. 3, 2008

(30) Foreign Application Priority Data

Apr. 24, 2006 (KR) .................. 10-2006-0036511

(51) Int. Cl.
H04W 4/00 (2009.01)
(52) U.S. Cl. .................. 370/329; 370/335; 370/395.41; 370/342; 370/208; 370/230; 370/237; 370/395.2; 370/328; 370/352; 455/452.1; 455/452.2; 455/512; 455/515
(58) Field of Classification Search ................. 370/329, 370/335, 342, 208, 230, 237, 395.2, 328, 370/352, 395.41; 455/452.1, 452.2, 512, 455/515; 375/220, 260
See application file for complete search history.

(56) References Cited

U.S. PATENT DOCUMENTS

| 5,495,483 | A | * | 2/1996 | Grube et al. ................. 370/341 |
| 6,819,930 | B1 | * | 11/2004 | Laroia et al. ................. 455/450 |
| 7,577,127 | B2 | * | 8/2009 | Kim et al. .................... 370/343 |
| 2003/0133426 | A1 | * | 7/2003 | Schein et al. ............... 370/337 |
| 2003/0147454 | A1 | * | 8/2003 | Kwon et al. ................. 375/146 |
| 2004/0087320 | A1 | * | 5/2004 | Kim et al. .................... 455/458 |
| 2005/0007974 | A1 | * | 1/2005 | Vasudevan et al. .......... 370/320 |
| 2007/0104135 | A1 | * | 5/2007 | Pecen et al. ................. 370/329 |

* cited by examiner

Primary Examiner—Rafael Pérez-Gutiérrez
Assistant Examiner—Nimesh Patel
(74) Attorney, Agent, or Firm—The Farrell Law Firm, P.C.

(57) ABSTRACT

A method for transmitting/receiving resource allocation information in a mobile communication system using a shared control channel. The transmission method includes performing scheduling for resource allocation to a plurality of terminals; generating, in a bitmap, information indicating allocation/non-allocation of resources which are not sequentially allocated beginning from a particular terminal using the scheduling result; and transmitting, over the shared control channel, resource allocation information including a terminal identifier and a resource allocation bitmap of each terminal. The reception method includes receiving from a wireless network a shared control channel including resource allocation information; determining whether a terminal identifier included in the resource allocation information is equal to a terminal identifier of the terminal; and updating a size of an available resource set according to a resource allocation bitmap for reception of next resource allocation information, if the included terminal identifier is not equal to the terminal identifier of the terminal.

10 Claims, 3 Drawing Sheets

METHOD AND APPARATUS FOR TRANSMITTING/RECEIVING RESOURCE ALLOCATION INFORMATION THROUGH BITMAP IN A MOBILE COMMUNICATION SYSTEM USING SHARED CONTROL CHANNEL

PRIORITY

This application claims priority under 35 U.S.C. §119(a) to a Korean Patent Application filed in the Korean Intellectual Property Office on Apr. 24, 2006 and assigned Serial No. 2006-36511, the disclosure of which is incorporated herein by reference.

BACKGROUND OF THE INVENTION

1. Field of the Invention

The present invention relates generally to the indication of resource allocation information in a packet data mobile communication system, and in particular, to a method and apparatus for transmitting/receiving resource allocation information through a bitmap.

2. Description of the Related Art

In a general packet data mobile communication system, a base station performs scheduling during every slot or Transmission Time Interval (TTI), or during multiple slots, to determine to which terminal the base station will allocate which resources during the corresponding slot, and then transmits the resource allocation information over a shared control channel or a data control channel. The resources are subject to change according to system operation. For example, the resources can be code resources such as Walsh codes in a Code Division Multiple Access (CDMA) system, frequency band resources in a Frequency Division Multiple Access (FDMA) system, sub-carrier resources in an Orthogonal Frequency Division Multiple Access (OFDMA) system, and time slot resources in a Time Division Multiple Access (TDMA) system. Because the sub-carriers belong to frequency, both the sub-carrier resources and the frequency band resources will be referred to herein as frequency resources.

It is possible for a system to support all of the CDMA, FDMA, OFDMA and TDMA systems. In this case, the resources can include all of codes, frequencies, and time slots. In the following description, it should be noted that the resources refer to all or some of codes, sub-carriers and time slots according to system configuration.

A detailed description of the shared control channel will now be made. A base station performs scheduling during every slot, and transmits over the shared control channel an indicator indicating to which terminal the base station will allocate which resources during the slot according to the scheduling result. Although the scheduling is achieved herein for every slot for convenience, the scheduling can also be performed every several slots. The scheduling result information included in the shared control channel can include various control information for other functions supported by a particular system, in addition to the information indicating to which terminal the base station allocates which resources.

The control information as used herein refers to the information indicating to which terminal the base station allocates which resources. Each of the terminals (active terminals in reality) in the system demodulates the shared control channel transmitted by the base station every slot, determines whether there are resources allocated thereto at this slot, and transmits/receives data using the allocated resources if there are resources allocated thereto.

An indicator indicating to which terminal the base station will allocate which resources is generally implemented using a terminal identifier and a resource allocation identifier. That is, it is assumed that all terminals in the system have their own unique identifiers, and the code and frequency resources also have unique identifiers according to a predetermined regular rule. For example, it is assumed that the terminal identifier is expressed with 10 bits, and the amount of resources included in one slot is 12. Generally, the amount of resources allocated to a terminal having the terminal identifier is transmitted with 12 bits over the shared control channel together with the 10-bit terminal identifier using a bitmap scheme. That is, for 12 resources, the indicator indicates using a bitmap whether to allocate each of the resources.

Assuming that N terminals are simultaneously scheduled to an arbitrary slot, N×(10+12) bits are needed to transmit/receive resource allocation information using a bitmap. However, the shared control channel, to which Hybrid Automatic reQuest (HARQ) is not applied, is a channel having high (or expensive) overhead, and transmission of the resource allocation information having the large amount of information causes degradation of system performance.

SUMMARY OF THE INVENTION

An aspect of the present invention is to address at least the problems and/or disadvantages and to provide at least the advantages described below. Accordingly, an aspect of the present invention is to provide a method and apparatus for reducing the number of bits required for the transmission/reception of the resource allocation information in a mobile communication system.

Another aspect of the present invention is to provide a transmission/reception method and apparatus for reducing the overhead of a shared control channel in a mobile communication system.

Another aspect of the present invention is to provide a method and apparatus for the transmission/reception of a shared control channel, capable of improving system performance in a mobile communication system.

According to one aspect of the present invention, there is provided a method for transmitting resource allocation information in a mobile communication system using a shared control channel. The transmission method includes performing scheduling for resource allocation to a plurality of terminals; generating, in a bitmap, information indicating allocation/non-allocation of resources which are not sequentially allocated beginning from a particular terminal using the scheduling result; and transmitting, over the shared control channel, resource allocation information including a terminal identifier and a resource allocation bitmap of each terminal.

According to another aspect of the present invention, there is provided an apparatus for transmitting resource allocation information in a mobile communication system using a shared control channel. The transmission apparatus includes a resource allocator for performing scheduling for resource allocation to a plurality of terminals; a shared control channel former for forming a shared control channel including resource allocation information having a terminal identifier and a resource allocation bitmap of each terminal; a shared control channel transmitter for transmitting the shared control channel to a wireless network; and a controller for controlling the generation, in a bitmap, of information indicating allocation/non-allocation of resources which are not sequentially allocated beginning from a particular terminal using the scheduling result.

According to further another aspect of the present invention, there is provided a method for receiving resource allocation information in a mobile communication system using a shared control channel. The reception method includes receiving from a wireless network a shared control channel including resource allocation information; determining whether a terminal identifier included in the resource allocation information is equal to its own terminal identifier; and updating a size of an available resource set according to a resource allocation bitmap for reception of next resource allocation information, if the terminal identifier included in the resource allocation information is not equal to its own terminal identifier.

According to yet another aspect of the present invention, there is provided an apparatus for receiving resource allocation information in a mobile communication system using a shared control channel. The reception apparatus includes a shared control channel receiver for receiving from a wireless network a shared control channel including resource allocation information; a demodulator for demodulating the received shared control channel; and a controller for determining whether a terminal identifier included in the resource allocation information is equal to its own terminal identifier, and updating a size of an available resource set according to a resource allocation bitmap for reception of next resource allocation information, if the terminal identifier included in the resource allocation information is not equal to its own terminal identifier.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a method in which a base station simultaneously allocates resources for multiple terminals and transmits the resource allocation information over a shared control channel using a bitmap, wherein the size of which is reduced on a step-by-step basis.

Figure 1:
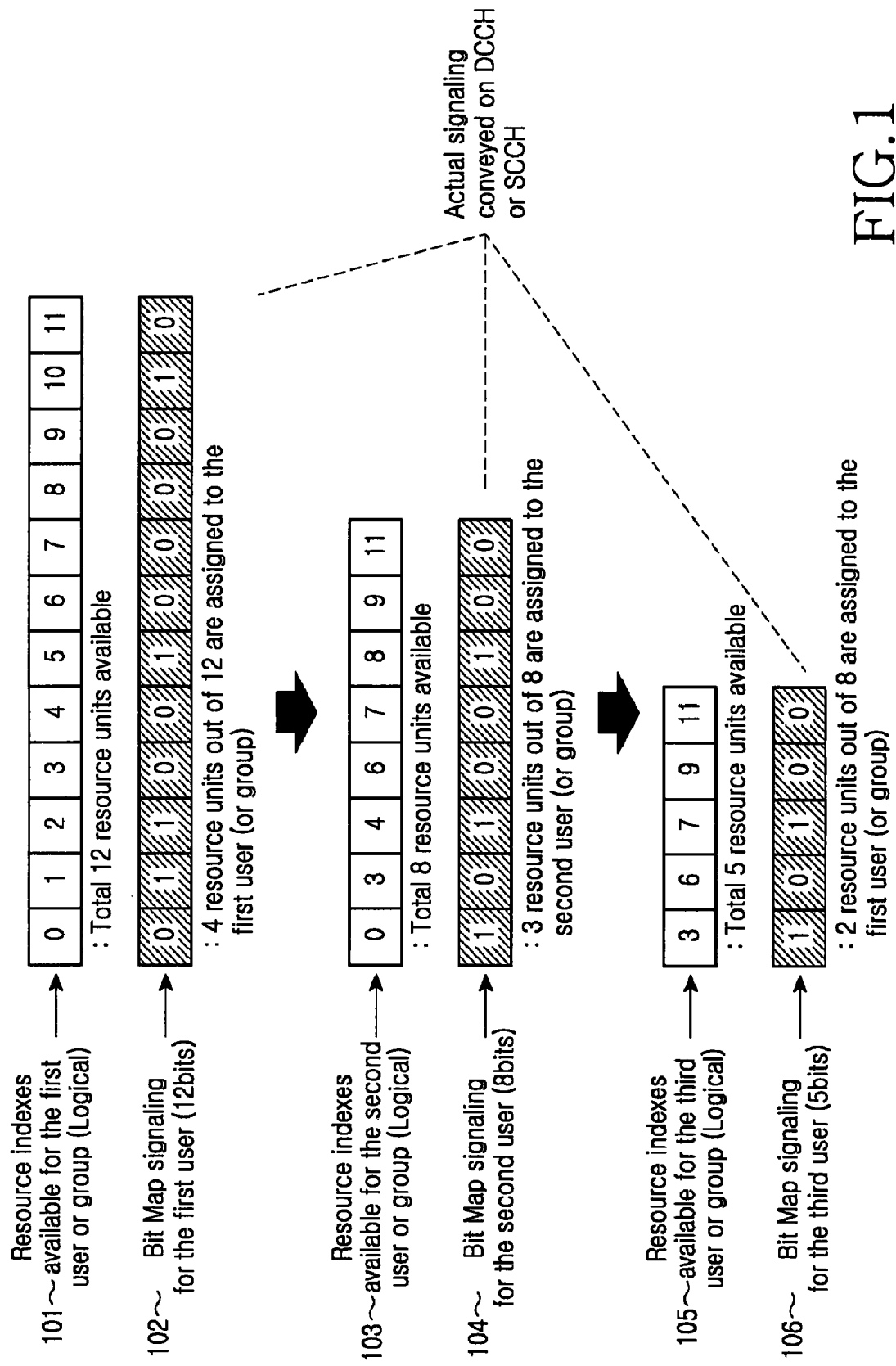
FIG. 1 is a diagram illustrating an example of resource allocation information included in a shared control channel according to an embodiment of the present invention.

FIG. 1 illustrates an example of resource allocation information included in a shared control channel according to an embodiment of the present invention.

Referring to FIG. 1, resource allocation information transmitted over a shared control channel includes a terminal identifier and a resource allocation bitmap. Each terminal determines whether there are resources allocated thereto depending on the terminal identifier, and identifies which resources have been allocated to the terminal depending on the resource allocation bitmap. In practice, the terminal identifier can be an identifier for one terminal, or can be an identifier for a group of several terminals. Reference numeral 101 denotes the initial resources available for a first terminal (or group), i.e. denotes a set of resources allocable to terminals through scheduling at a given time. It is assumed in FIG. 1 that the number of initial available resources is 12, and the available resources are assigned identifiers (or indexes) #0 to #11, for convenience. To allocate the 12 available resources using the bitmap scheme, 12 bits are needed.

Reference numeral 102 denotes resource allocation information for a first terminal (or group), and the resource allocation information has a 12-bit bitmap. In the bitmap 102, resources denoted by '1' indicate resources allocated for the first terminal, and resources denoted by '0' indicate resources not allocated for the first terminal. In the example of FIG. 1, it is noted that the resources allocated with 12 bits of '0110 0100 0010' through the bitmap 102 are resources #1, #2,#5 and #10. Since the 4 resources #1, #2, #5 and #10 out of the initial 12 available resources have already been allocated to the first terminal, the 4 resources #1, #2, #5 and #10 are not of interest to a second terminal when a bitmap is transmitted to the second terminal. As a result, a size of the bitmap used for the second terminal can be reduced.

Reference numeral 103 indicates that there are 8 resource units for resource allocation to the second terminal. It can be understood that an 8-bit bitmap 104 for the 8 resources is used for resource allocation to the second terminal. Because the bitmap 104 for resource allocation to the second terminal is '1010 0100', three resources are allocated for the second terminal and resource identifiers of the three resources are #0, #4 and #8. By repeating the foregoing method, resource allocation information for third and fourth terminals is configured. If a bitmap is configured for resource allocation to each terminal in the manner of FIG. 1, the number of bits required for the bitmap is reduced on a step-by-step basis.

Figure 2:
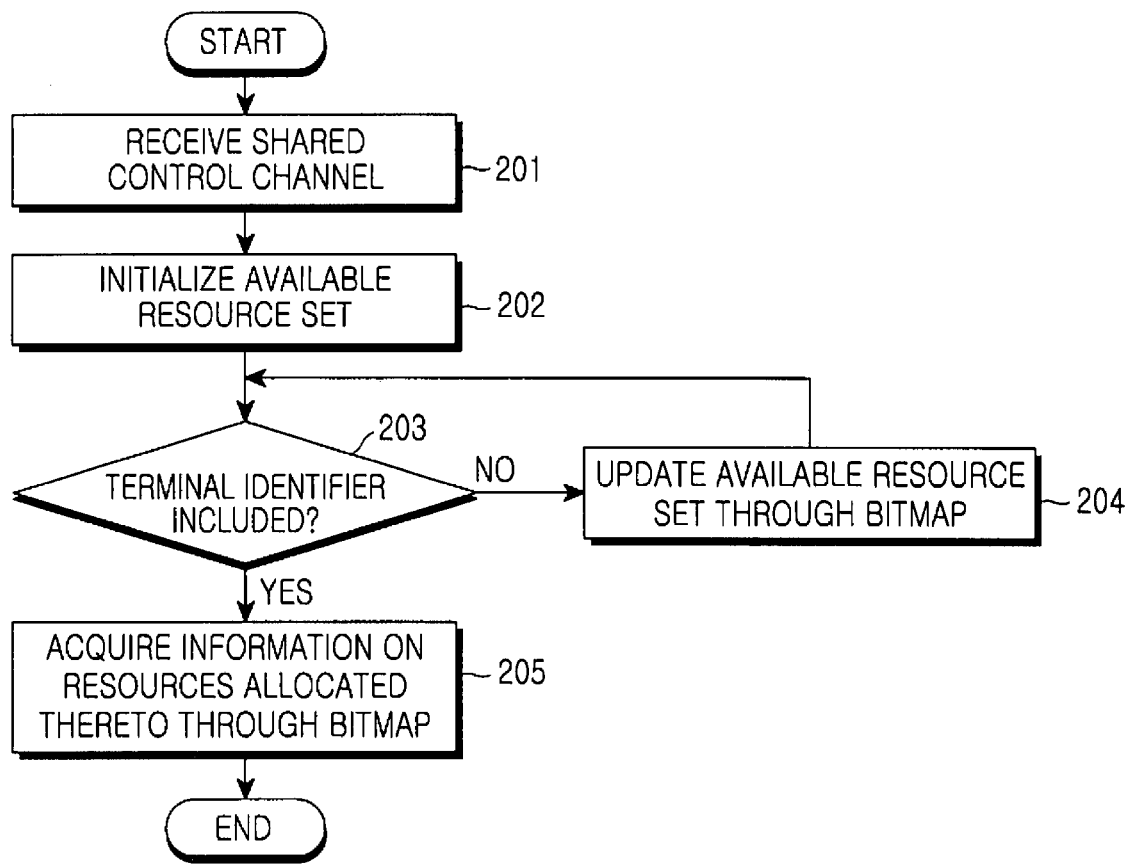
FIG. 2 is a flowchart illustrating a process of acquiring, by a terminal, information on resources allocated thereto according to an embodiment of the present invention.

FIG. 2 illustrates a process of acquiring, by a terminal, information on resources allocated thereto according to an embodiment of the present invention.

Referring to FIG. 2, a terminal receives a shared control channel in step 201, and initializes a set of available resources in step 202. As an example of the initialization process, because initial available resources are #0, #1, . . . , #11 in FIG. 1, this set includes initial available resources. The terminal determines in step 203 whether there is its own terminal identifier in a part {terminal identifier, resource allocation bitmap} included in first resource allocation information of the shared control channel. If it is determined in step 203 that its own terminal identifier in not included, this means that the resources are allocated to another terminal. In this case, the terminal proceeds to step 204 where it updates its existing available resource set. In the update process, the terminal updates a size of the available resource set and information indicating the available resources.

The update process is performed as shown by reference numerals 102 and 103 in FIG. 1. Describing the update process with reference to FIG. 1, a corresponding terminal recognizes that resources allocated to another terminal are #1, #2, #5 and #10, and excludes the four allocated resources from the existing available resource set. In this case, a size of the available resource set is reduced from 12 to 8. The terminal receives the next resource allocation information {terminal identifier, resource allocation bitmap} using the size-reduced available resource set. In the update process, it should be noted that the number of bits used for the resource allocation bitmap coincides with a size of the updated available resource set. That is, if a size of the available resource set is reduced from 12 to 8, the number of bits used for resource allocation bitmap is also reduced from 12 to 8.

The terminal repeats the operation of steps 203 and 204 until its own terminal identifier is detected. This process continues until resources are reallocated after all resources are allocated. If it is determined in step 203 that its own terminal identifier is detected from the received resource allocation information, the terminal acquires in step 205 the information indicating which resources are allocated thereto, through the resource allocation bitmap.

Although the embodiment of the present invention has been described in FIGS. 1 and 2 for the case where there is only one shared control channel, as an example, the same can be used even for the case where the base station transmits multiple shared control channels. For example, if there are more than two shared control channels, the terminal continuously updates an available resource set through a bitmap for each of the shared control channels in the manner described in FIGS. 1 and 2, and then acquires its own resource allocation information.

Figure 3:
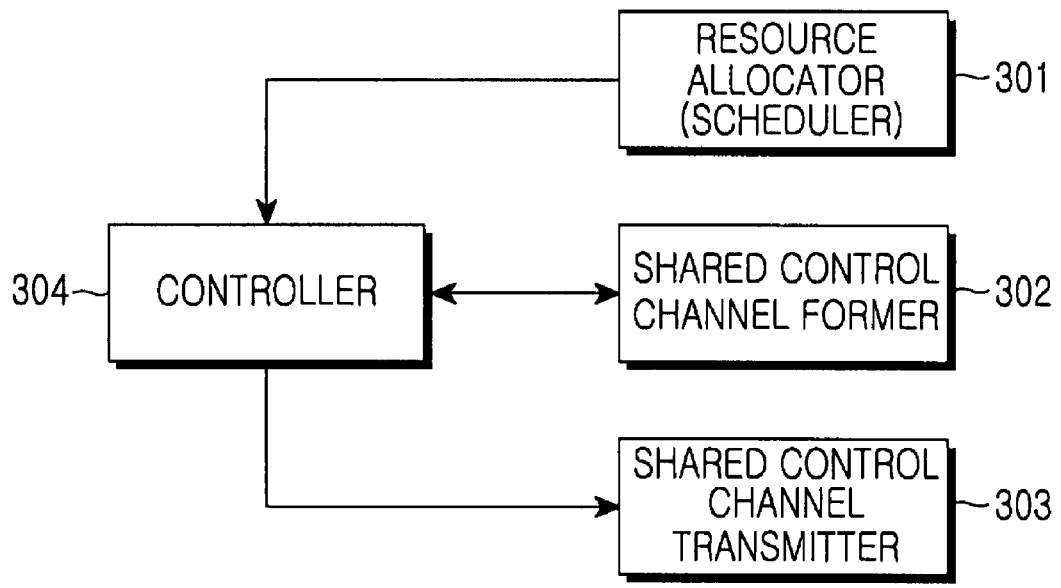
FIG. 3 is a block diagram illustrating a structure of a base station transmitter according to an embodiment of the present invention.

FIG. 3 illustrates a structure of a base station transmitter according to an embodiment of the present invention.

Referring to FIG. 3, a resource allocator 301 serves as a scheduler that schedules resource allocation to multiple terminals. Resource allocation information including a terminal identifier and a resource allocation bitmap of each terminal according to scheduling results of the resource allocator 301 is delivered to a controller 304. The controller 304 delivers the resource allocation information to a shared control channel former 302, and the shared control channel former 302 generates a shared control channel so as to transmit specific control information including the resource allocation information in the manner described in FIG. 1. For this purpose, the controller 304 controls the shared control channel former 302 so as to generate a resource allocation bitmap for the multiple terminals by excluding the resources allocated to each terminal on a step-by-step basis according to the scheduling result. In addition, the controller 304 controls a shared control channel transmitter 303 to transmit the shared control channel formed by the shared control channel former 302 to the wireless network. Therefore, the shared control channel formed by the shared control channel former 302 can be directly provided to the shared control channel transmitter 303, or the controller 304 can receive the shared control channel from the shared control channel former 302 and provide it to the shared control channel transmitter 303.

Figure 4:
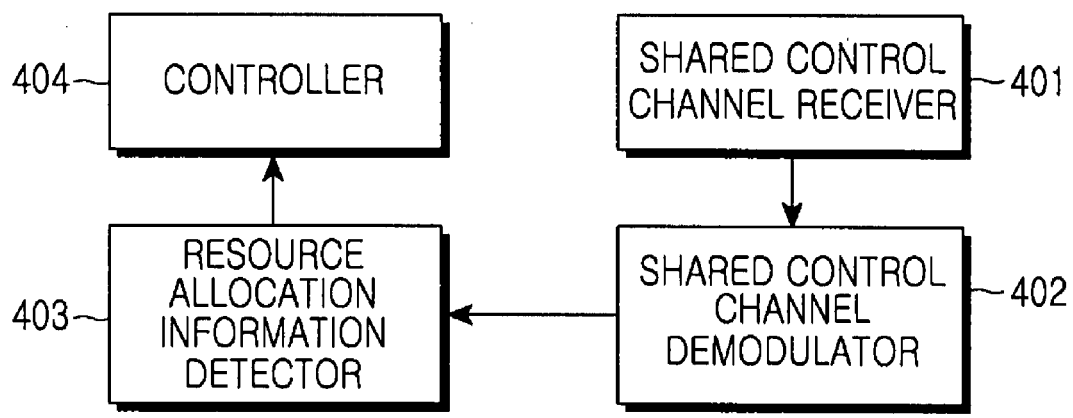
FIG. 4 is a block diagram illustrating a structure of a terminal receiver according to an embodiment of the present invention.

FIG. 4 illustrates a structure of a terminal receiver according to an embodiment of the present invention.

Referring to FIG. 4, shared control channel receiver 401 receives a shared control channel transmitted by a base station, and a shared control channel demodulator 402 demodulates control information transmitted over the received shared control channel. A resource allocation information detector 403 detects resource allocation information from the control information, and a controller 404 checks a terminal identifier and a resource allocation bitmap in the detected resource allocation information. If there is no terminal identifier being equal to its own terminal identifier, the controller 404 updates an available resource set through the resource allocation bitmap. However, if there is a terminal identifier that is equal to its own terminal identifier, the controller 404 acquires information on the resources allocated thereto through the resource allocation bitmap.

As is apparent from the foregoing description, according to the present invention, the mobile communication system using the shared control channel minimizes the amount of information transmitted for resource allocation, thereby contributing to an increase in the system capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting resource allocation information in a mobile communication system using a shared control channel, the method comprising:
    performing scheduling for resource allocation to a plurality of terminals;
    generating resource allocation information indicating an allocation/non-allocation of resources using the scheduling result, wherein the resource allocation information includes a bitmap generated for a first terminal from among the plurality of terminals indicating allocation/non-allocation for each resource of an available resource set, and a bitmap for a second terminal from among the plurality of terminals indicating allocation/non-allocation only for resources of the available resource set that were not allocated to the first terminal; and
    transmitting, over the shared control channel, the resource allocation information including a terminal identifier and a resource allocation bitmap of each terminal.

2. The method of claim 1, wherein the bitmaps are included in the resource allocation information for a terminal group.

3. An apparatus for transmitting resource allocation information in a mobile communication system using a shared control channel, the apparatus comprising:
    a resource allocator for performing scheduling for resource allocation to a plurality of terminals;
    a shared control channel former for forming a shared control channel including resource allocation information having a terminal identifier and a resource allocation bitmap of each terminal;
    a shared control channel transmitter for transmitting the shared control channel to a wireless network; and
    a controller for controlling generation of the resource allocation information indicating allocation/non-allocation of resources using a scheduling result,
    wherein a bitmap generated for a first terminal among the plurality of terminals indicates allocation/non-allocation for each resource of an available resource set, and a bitmap for a second terminal among the plurality of terminals indicates allocation/non-allocation only for resources of the available resource set that were not allocated to the first terminal.

4. The apparatus of claim 3, wherein the bitmaps are included in the resource allocation information for a terminal group.

5. A method for receiving resource allocation information in a mobile communication system using a shared control channel, the method comprising:
    receiving from a wireless network a shared control channel including resource allocation information;
    determining whether a terminal identifier included in the resource allocation information is equal to a terminal identifier of a mobile terminal; and
    if the terminal identifier included in the resource allocation information is not equal to the terminal identifier of the mobile terminal, identifying resources allocated to another mobile terminal from among each resource of an available resource set, excluding the resources allocated to the another mobile terminal from among resources of the available resource set that will be checked for allocation/non-allocation in next resource allocation information, and receiving the next resource allocation information.

6. The method of claim 5, wherein excluding the resources allocated to the another mobile terminal from among the resources of the available resource set comprises reducing a size of the available resource set by excluding the allocated resources from the available resource set.

7. The method of claim 5, further comprising:
acquiring information on the allocation/non-allocation of resources excluding the resources allocated to the another mobile terminal from among the resources of the available resource set in the resource allocation information, if the terminal identifier included in the resource allocation information is equal to the terminal identifier of the mobile terminal.

8. An apparatus for receiving resource allocation information in a mobile communication system using a shared control channel, the apparatus comprising:
a shared control channel receiver for receiving from a wireless network a shared control channel including resource allocation information;
a demodulator for demodulating the received shared control channel; and
a controller for determining whether a terminal identifier included in the resource allocation information is equal to a terminal identifier of the apparatus, and if the terminal identifier included in the resource allocation information is not equal to the terminal identifier of the apparatus, identifying resources allocated to another apparatus from among each resource of an available resource set, and excluding the resources allocated to the another apparatus from among the resources of the available resource set that will be checked for allocation/non-allocation in next resource allocation information.

9. The apparatus of claim 8, wherein in excluding the resources allocated to the another apparatus from among the resources of the available resource set, the controller reduces a size of the available resource set by excluding the allocated resources from the available resource set.

10. The apparatus of claim 8, wherein the controller acquires information on the allocation/non-allocation of resources excluding the resources allocated to the another apparatus from among the resources of the available resource set in the resource allocation information, if the terminal identifier included in the resource allocation information is equal to the terminal identifier of the apparatus.

* * * * *

UNITED STATES PATENT AND TRADEMARK OFFICE
CERTIFICATE OF CORRECTION

| | | |
|---|---|---|
| PATENT NO. | : 7,894,391 B2 | Page 1 of 1 |
| APPLICATION NO. | : 11/789400 | |
| DATED | : February 22, 2011 | |
| INVENTOR(S) | : Hwan-Joon Kwon et al. | |

It is certified that error appears in the above-identified patent and that said Letters Patent is hereby corrected as shown below:

Title Page, Item (75) Inventors:

"Dong-Hoo KIM" should be --Dong-Hee KIM--.

Signed and Sealed this
Twelfth Day of June, 2012

David J. Kappos
*Director of the United States Patent and Trademark Office*